March 1, 1927.
M. L. PAULSON
1,619,433
PUNCTUREPROOF PNEUMATIC TIRE
Filed May 5, 1926
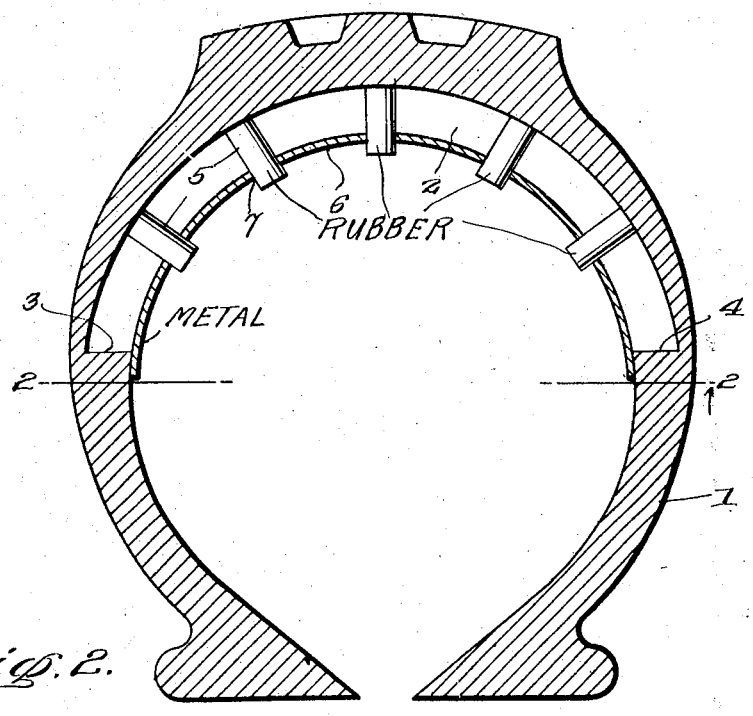
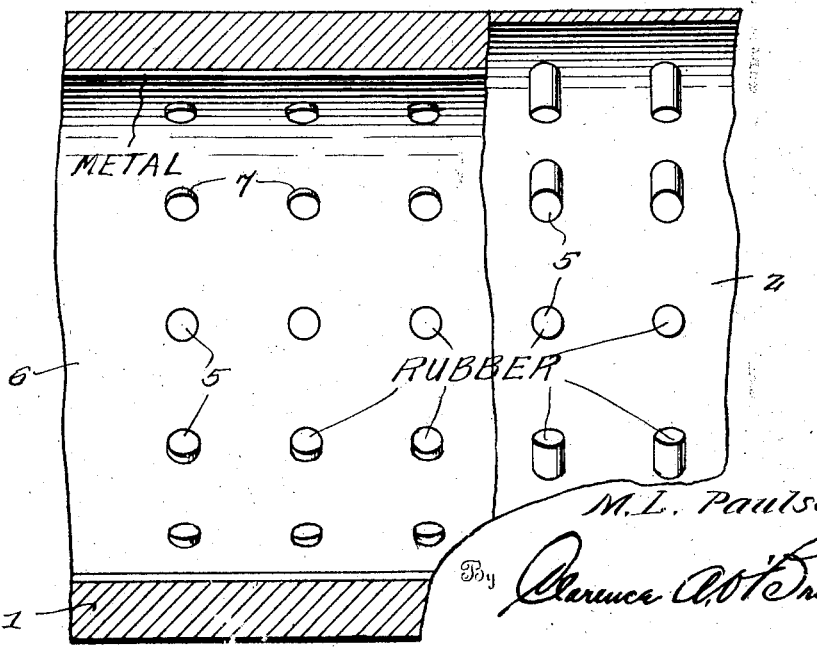
Inventor
M. L. Paulson.
By Clarence A. O'Brien.
Attorney Patented Mar. 1, 1927.

1,619,433

UNITED STATES PATENT OFFICE.

MARTIN L. PAULSON, OF FORT SNELLING, MINNESOTA.

PUNCTUREPROOF PNEUMATIC TIRE.

Application filed May 5, 1926. Serial No. 106,898.

The present invention relates to improvements in pneumatic tires, and has for its principal object to provide means in association with the tire casing which will protect the pneumatic inner tube from being punctured by any sharp object which might accidently pierce the tread portion of the tire casing.

Another object of the invention is to provide a pneumatic tire which includes a circumferentially extending metallic protector shield which is adapted to be interposed between the tire casing and the pneumatic inner tube, resilient plugs which extend inwardly from the tire casing and project through suitable openings provided therefor in the metallic protector plate so that the inflatable inner tube will engage the inner free ends of the resilient plugs.

A still further object is to provide a punctureproof pneumatic tire of the above mentioned character which is simple in construction, inexpensive, strong, and durable and further well adapted to the purpose for which it is designed.

Other objects and advantages of the invention will become apparent from the following description taken in connection with the accompanying drawing.

In the accompanying drawing forming a part of this application and in which like numerals designate like parts throughout the several views:

Figure 1 is a cross sectional view through the tire casing, and the protector plate associated therewith, and Figure 2 is a sectional view taken approximately on line 2—2 of Figure 1, looking in the direction of the arrows.

In the drawing wherein for the purpose of illustration is shown the preferred embodiment of my invention, the numeral 1 designates the tire casing, the inner wall thereof being cut away transversely as at 2 from the points 3 and 4 respectively, and this cut away portion extends circumferentially of the tire casing. The purpose of the cut away portion will be hereinafter more fully described.

As is more clearly shown in Figure 1, the cut away portion 2 extends from the intermediate portion of one of the side walls of the tire casing to the intermediate portion of the other side wall.

A series of pins or plugs which are preferably formed of rubber and which are designated by the numeral 5 extend inwardly from the cut out portion 2, the outer ends of these rubber pins or plugs being secured in the tire casing in any suitable manner. These rubber pins or plugs are preferably arranged in rows and are properly spaced from each other as is more clearly shown in Figure 2.

The purpose of these pins or plugs will also be hereinafter more fully described.

A transversely curved metallic protector plate 6 extends circumferentially around the inner tube (not shown) which is associated with the tire casing in the usual manner, and this protector plate provides a closure for the cut out portion of the tire casing, the edges of the protector plate extending beyond the shoulders 3 and 4 formed by the cut out portion 2 as is clearly illustrated in Figure 1. This metallic protector plate provides a means for preventing any sharp object such as a nail, piece of glass, or the like which might accidentally pierce the outer portions of the side walls of the tire casing from coming in contact with the pneumatic inner tube, thereby preventing any possibility of a puncture or a blow out occurring.

For the purpose of spacing the inner face of the metallic protector plate 6 from engagement with the pneumatic inner tube, the rubber plugs or pins 5 are of such length as to have their free ends extending through suitable openings 7 provided therefor in the plate and as is clearly shown in Figure 1, the inner ends of these rubber pins or plugs project beyond the inner face of the metallic plate so that the inner ends of the plugs or pins will engage the inner tube and will space the same from the metallic plate. Furthermore, by forming the pins or plugs of rubber, there will be no danger of the same puncturing or otherwise injuring the pneumatic inner tube.

It will thus be seen from the foregoing description, that I have provided a pneumatic tire which will eliminate all possibilities of the inner tube being punctured by any sharp object which accidentally might penetrate the tread portion of the casing, and furthermore the metallic plate is associated in the tire casing in such a manner as to prevent the same injuring the inner tube.

While I have shown the preferred embodiment of my invention it is to be understood that minor changes in the size, shape and arrangement of parts may be resorted to without departing from the spirit of the invention and the scope of the appended claims.

Having thus described the invention, what I claim as new and desire to secure by Letters Patent is:—

1. In a pneumatic tire casing, a metallic protector plate substantially semi-circular in cross section extending circumferentially within the casing, and a series of rubber plugs extending inwardly from the inner wall of the casing through the plate.

2. In a pneumatic tire casing, a metallic protector plate substantially semi-circular in cross section extending circumferentially within the casing, said plate being provided with series of spaced openings, and a series of rubber plugs carried by the inner wall of the casing, the inner free ends of said plugs extending through the openings provided therefor in the metallic plate.

3. In a penumatic tire casing, the same being provided with a circumferentially extending cut out portion which extends from the intermediate portion of one of the side walls of the casing to the intermediate portion of the other side wall, a metallic protector plate substantially semi-circular in cross section extending circumferentially in the tire casing, the edge portions of said metallic plates extending beyond the respective ends of the cut out portions of the tire casing, said plate being provided with a series of spaced openings, and a series of rubber plugs extending inwardly from the inner wall of the cut out portion of the casing through the openings in the metallic plate.

In testimony whereof I affix my signature.

MARTIN L. PAULSON.